US008377529B2

(12) United States Patent
Bekele

(10) Patent No.: US 8,377,529 B2
(45) Date of Patent: Feb. 19, 2013

(54) ULTRA HIGH BARRIER ASEPTIC FILM AND PACKAGE

(75) Inventor: Solomon Bekele, Taylors, SC (US)

(73) Assignee: Cryovac, Inc., Duncan, SC (US)

( * ) Notice: Subject to any disclaimer, the term of this patent is extended or adjusted under 35 U.S.C. 154(b) by 232 days.

(21) Appl. No.: 12/770,954

(22) Filed: Apr. 30, 2010

(65) Prior Publication Data

US 2011/0027428 A1 Feb. 3, 2011

Related U.S. Application Data

(60) Provisional application No. 61/271,906, filed on Jul. 28, 2009.

(51) Int. Cl.
*B32B 27/00* (2006.01)
*B32B 27/08* (2006.01)
*B32B 27/30* (2006.01)
*B32B 27/34* (2006.01)

(52) U.S. Cl. .................. 428/35.2; 428/35.4; 428/474.4; 428/36.6; 428/36.7

(58) Field of Classification Search .................. 428/35.2, 428/35.4, 474.4, 36.7, 36.6
See application file for complete search history.

(56) References Cited

U.S. PATENT DOCUMENTS

| | | | |
|---|---|---|---|
| 3,620,435 A | 11/1971 | Sogi | |
| 4,261,473 A * | 4/1981 | Yamada et al. | 215/379 |
| 4,421,823 A | 12/1983 | Theisen et al. | |
| 4,506,494 A | 3/1985 | Shimoyama et al. | |
| 4,526,823 A | 7/1985 | Farrell et al. | |
| 4,551,366 A | 11/1985 | Maruhashi et al. | |
| 4,557,780 A | 12/1985 | Newsome et al. | |
| 4,589,247 A | 5/1986 | Tsuruta et al. | |
| 4,608,286 A | 8/1986 | Motoishi et al. | |
| 4,656,818 A | 4/1987 | Shimoyama et al. | |
| 4,701,360 A | 10/1987 | Gibbons et al. | |
| 4,768,411 A | 9/1988 | Su | |
| 4,770,944 A * | 9/1988 | Farrell et al. | 428/474.4 |
| 4,808,010 A | 2/1989 | Vogan | |
| 4,894,267 A | 1/1990 | Bettle, III et al. | |
| 4,977,004 A | 12/1990 | Bettle, III et al. | |
| 5,055,355 A * | 10/1991 | DeAntonis et al. | 428/476.3 |
| 5,061,534 A * | 10/1991 | Blemberg et al. | 428/36.7 |
| 5,066,443 A | 11/1991 | Cloeren | |
| 5,344,715 A * | 9/1994 | Negi et al. | 428/520 |
| 5,467,581 A | 11/1995 | Everette | |
| 5,895,694 A * | 4/1999 | Zavadsky et al. | 428/36.7 |
| 5,972,447 A * | 10/1999 | Hata et al. | 428/35.7 |
| 6,068,933 A * | 5/2000 | Shepard et al. | 428/474.4 |
| 6,096,358 A | 8/2000 | Murdick et al. | |
| 6,165,573 A | 12/2000 | Hirose et al. | |
| 6,255,396 B1 | 7/2001 | Ding et al. | |
| 6,383,583 B1 * | 5/2002 | Ninomiya et al. | 428/35.4 |
| 6,479,160 B1 | 11/2002 | Tsai et al. | |
| 6,503,588 B1 * | 1/2003 | Hayashi et al. | 428/36.7 |
| 6,715,511 B2 | 4/2004 | Yamamoto et al. | |
| 6,727,002 B2 | 4/2004 | Hoch et al. | |
| 6,822,031 B2 * | 11/2004 | Tai et al. | 524/398 |
| 7,029,734 B1 | 4/2006 | Wuest et al. | |
| 7,053,172 B2 | 5/2006 | Sato et al. | |
| 7,063,873 B2 | 6/2006 | Bellet et al. | |
| 7,064,158 B2 | 6/2006 | Tai et al. | |
| 7,217,033 B2 | 5/2007 | Pritchard | |
| 7,252,878 B2 | 8/2007 | Watanabe et al. | |
| 7,258,929 B2 | 8/2007 | Kanda et al. | |
| 7,384,679 B2 | 6/2008 | Blemberg et al. | |
| 7,892,615 B2 * | 2/2011 | Matsuoka et al. | 428/36.6 |
| 8,178,180 B2 * | 5/2012 | Penttinen et al. | 428/36.6 |
| 2002/0034622 A1 | 3/2002 | Edwards et al. | |
| 2002/0119334 A1 * | 8/2002 | Shepard et al. | 428/474.4 |
| 2002/0155308 A1 | 10/2002 | Heffelfinger et al. | |
| 2003/0148123 A1 | 8/2003 | Musco et al. | |
| 2004/0013862 A1 | 1/2004 | Brebion et al. | |
| 2004/0037983 A1 * | 2/2004 | Reighard et al. | 428/36.7 |
| 2005/0153087 A1 | 7/2005 | Tsuji et al. | |
| 2006/0228502 A1 | 10/2006 | Bekele | |
| 2006/0281882 A1 | 12/2006 | Tsuji et al. | |
| 2007/0110853 A1 | 5/2007 | Bekele | |
| 2009/0061061 A1 | 3/2009 | Beckwith et al. | |
| 2009/0123611 A1 | 5/2009 | Bekele | |
| 2010/0272869 A1 | 10/2010 | Bekele | |

FOREIGN PATENT DOCUMENTS

WO WO 00/76765 A1 12/2000
WO WO 2008/153980 A1 12/2008

OTHER PUBLICATIONS

Chapter 10 Measurement Values (re: ASTM E308-08), Aug. 2001, 12 pages.

* cited by examiner

*Primary Examiner* — Michele L Jacobson
(74) *Attorney, Agent, or Firm* — Mark B. Quatt

(57) ABSTRACT

A coextruded multilayer film includes a core layer including a polyamide; two intermediate layers each including an ethylene vinyl alcohol copolymer; a first and second outer layer each including an olefinic copolymer or an amorphous cyclic olefin copolymer; and two tie layers each adhering an intermediate layer to a respective outer layer; the ethylene vinyl alcohol copolymer of the first intermediate layer having a mole % ethylene at least 5 greater than the mole % ethylene of the ethylene vinyl alcohol copolymer of the second intermediate layer An aseptic package includes a sterilized food product, and a sterilized pouch in which the sterilized food product is disposed, the sterilized pouch including the film of the invention. A method of making an aseptic package is also disclosed.

14 Claims, No Drawings

ULTRA HIGH BARRIER ASEPTIC FILM AND PACKAGE

This application claims the benefit of U.S. Provisional Application No. 61/271,906, filed Jul. 28, 2009, that application incorporated herein by reference in its entirety.

FIELD OF THE INVENTION

The invention relates to a film for packaging, such as aseptic packaging, and to a package and a method of making a package.

BACKGROUND OF THE INVENTION

Vertical form/fill/seal (VFFS) packaging systems have proven to be very useful in packaging a wide variety of food and non-food pumpable and/or flowable products. An example of such systems is the ONPACK™ flowable food packaging system marketed by Cryovac/Sealed Air Corporation. The VFFS process is known to those of skill in the art, and described for example in U.S. Pat. No. 4,506,494 (Shimoyama et al.), U.S. Pat. No. 4,589,247 (Tsuruta et al), U.S. Pat. No. 4,656,818 (Shimoyama et al.), U.S. Pat. No. 4,768,411 (Su), U.S. Pat. No. 4,808,010 (Vogan), and U.S. Pat. No. 5,467,581 (Everette), all incorporated herein by reference in their entirety. Typically in such a process, lay-flat thermoplastic film is advanced over a forming device to form a tube, a longitudinal (vertical) fin or lap seal is made, and a bottom end seal is made by transversely sealing across the tube with heated seal bars. A liquid, flowable, and/or pumpable product, such as a liquid, semiliquid, or paste, with or without particulates therein, is introduced through a central, vertical fill tube to the formed tubular film. Squeeze rollers spaced apart and above the bottom end seal squeeze the filled tube and pinch the walls of the flattened tube together. When a length of tubing of the desired height of the bag has been fed through the squeeze rollers a heat seal is made transversely across the flattened tubing by heat seal bars which clamp and seal the film of the tube therebetween. After the seal bars have been withdrawn the film moves downwardly to be contacted by cooled clamping and severing bars which clamp the film therebetween and are provided with a cutting knife to sever the sealed film at about the midpoint of the seal so that approximately half of the seal will be on the upper part of a tube and the other half on the lower. When the sealing and severing operation is complete, the squeeze rollers are separated to allow a new charge of product to enter the flattened tube after which the aforementioned described process is repeated thus continuously producing vertical form/fill/seal pouches which have a bottom end and top end heat seal closure.

The process can be a two-stage process where the creation of a transverse heat seal occurs at one stage in the process, and then, downstream of the first stage, a separate pair of cooling/clamping means contact the just-formed transverse heat seal to cool and thus strengthen the seal. In some VFFS processes, an upper transverse seal of a first pouch, and the lower transverse seal of a following pouch, are made, and the pouches are cut and thereby separated between two portions of the transverse seals, without the need for a separate step to clamp, cool, and cut the seals. A commercial example of an apparatus embodying this more simplified process is the ONPACK™ 2002 VFFS packaging machine marketed by Cryovac/Sealed Air Corporation.

Aseptic food packaging is a well known method of packaging foods for which sterilization of the food and the packaging material containing the food is required. It is known to produce sterilized packaging in which a sterile food product is placed in a sterilized container such as a pouch. The food product is thus preserved for later storage or use. Various methods of sterilizing the container, and filling the container with a pasteurized product, are known. Hydrogen peroxide is a common medium for sterilization of the packaging material.

In aseptic packaging applications such as vertical form fill seal pouch packaging, where hydrogen peroxide sterilization treatments are used, some films can unduly stretch after being made into a pouch and filled with the sterilized food product at elevated temperatures. These films are thus less desirable or unsuitable for this end use application where dimensional stability of the packaging material is of concern.

One current commercial packaging material for aseptic applications provides such dimensional stability, but in manufacture requires that various components of the material be laminated together. This is a relatively costly means of producing packaging materials. In the commercial laminate, biaxially oriented nylon 6 film is laminated by a conventional lamination adhesive such as polyester to a discrete multilayer substrate film. One commercial film has the construction:

| LDPE | Adh | PA6 | Adh | HDPE | PE | EVOH | LDPE | HDPE |
|------|------|------|------|------|------|------|------|------|
| 2.2 | 0.10 | 0.70 | 0.08 | 0.20 | 0.10 | 0.15 | 0.10 | 0.20 |

Where the values below each resin are the layer gauge in mils, and where:
LDPE=low density polyethylene
Adh=lamination adhesive
PA6=nylon 6
HDPE=high density polyethylene
PE=polyethylene
EVOH=ethylene/vinyl alcohol copolymer An important consideration in some aseptic packaging environments is that the packaging material exhibit good dimensional stability under load (e.g. the load of the contained food product when the packaging material is made into a package), and yet remain ductile and abuse resistant under packaging, storage, and transportation conditions. It is desirable that the packaging film possess relatively high storage modulus (E') (ASTM D5279-01). but also possess relatively high loss modulus (E") values at temperatures of from −150° C. to 150° C.

Copending patent application U.S. Ser. No. 11/100,739, filed 7 Apr., 2005, assigned to a common assignee with the present application, and entitled "Sterilizable Co-extruded Film For Aseptic Packaging", now published as US 2006/0228502 A1; and copending patent application U.S. Ser. No. 11/517,728, filed 8 Sep., 2006, assigned to a common assignee with the present application, and entitled "Dimensionally Stable Sterilizable Coextruded Film For Aseptic Packaging", now published as US 2007/0110853 A1, both publications incorporated herein by reference in their entirety, disclose coextruded multilayer films suitable for packaging products in aseptic conditions.

While these materials provide good performance in aseptic packaging, it is desirable to provide a film, for aseptic packaging, with even better oxygen barrier properties.

It is also desirable to provide a coextruded film, for pouches made in a VFFS system, that exhibits extended shelf life for the contained product by providing good oxygen barrier properties to the film and pouch made from the film.

SUMMARY OF THE INVENTION

In a first aspect of the present invention, a coextruded multilayer film comprises a core layer comprising polyamide; a first intermediate layer, directly adjacent the core layer, comprising ethylene vinyl alcohol copolymer; a second intermediate layer, directly adjacent the core layer, comprising ethylene vinyl alcohol copolymer; a first outer layer comprising olefinic copolymer or amorphous cyclic olefin copolymer; a second outer layer comprising olefinic copolymer or amorphous cyclic olefin copolymer; a first tie layer adhering the first intermediate layer to the first outer layer; and a second tie layer adhering the second intermediate layer to the second outer layer; wherein the ethylene vinyl alcohol copolymer of the first intermediate layer has an ethylene content, in mole %, at least 5 greater than the ethylene content, in mole %, of the ethylene vinyl alcohol copolymer of the second intermediate layer.

Optionally, according to various embodiments of the first aspect of the invention:
- a second layer comprising a polyamide is disposed between the first intermediate layer and the first tie layer.
- a second layer comprising a polyamide is disposed between the second intermediate layer and the second tie layer.
- a second layer comprising a polyamide is disposed between the first intermediate layer and the first tie layer, and a third layer comprising a polyamide is disposed between the second intermediate layer and the second tie layer.
- the polyamide of the core layer comprises nylon 6.
- the core layer comprises a blend of an amorphous polyamide having a glass transition temperature of at least 80° C., and a semicrystalline polyamide.
- the amorphous cyclic olefin copolymer of at least one of the first and second outer layers is ethylene norbornene copolymer.
- at least one of the first and second outer layers comprises a blend of amorphous cyclic olefin copolymer and semicrystalline olefinic polymer.
- at least one of the first and second outer layers comprises a blend of amorphous cyclic olefin copolymer and a semicrystalline olefinic polymer selected from the group consisting of ethylene polymer, ethylene copolymer, and polypropylene.
- the olefinic polymer, of at least one of the first and second outer layers, is selected from the group consisting of
  a) a blend of low density polyethylene and linear low density polyethylene;
  b) a blend of low density polyethylene and an ethylene/alpha-olefin interpenetrating network resin;
  c) propylene/ethylene copolymer;
  d) high density polyethylene;
  e) propylene homopolymer; and
  f) ethylene/norbornene copolymer.
- the first and second tie layers each comprises an anhydride grafted polymer or ethylene/acrylic acid copolymer.
- the film exhibits an oxygen transmission rate (ASTM D3985) at 15 days of less than 18, such as less than 15, such as less than 12, such as less than 8 cc oxygen/m$^2$·day @ 100% relative humidity inside and outside at 73° F. at one atmosphere.
- the film exhibits an elongation at yield (ASTM D 882) of less than 15%, such as less than 8% in each of the longitudinal and transverse directions.
- at least one of the first and second intermediate layer comprises ethylene vinyl alcohol copolymer in the absence of a thermoplastic resin comprising a carbon-carbon double bond.
- at least one of the first and second intermediate layer comprises ethylene vinyl alcohol copolymer in the absence of a transition metal catalyst or transition metal salt.
- at least one of the first and second intermediate layer consists essentially of ethylene vinyl alcohol copolymer in the absence of a thermoplastic resin comprising a carbon-carbon double bond.
- at least one of the first and second intermediate layer consists essentially of ethylene vinyl alcohol copolymer in the absence of a transition metal catalyst or transition metal salt.
- at least one of the first and second intermediate layer comprises ethylene vinyl alcohol copolymer blended with an active oxygen barrier.
- the film is flexible.
- the film is a blown film.
- both the first and second intermediate layers are internal layers, each having a film layer on either side thereof.
- the EVOH of the first intermediate layer has an ethylene content of from 27 mole % to 48 mole %.
- the EVOH of the second intermediate layer has an ethylene content of from 22 mole % to 38 mole %.
- the film is not a bottle.

In a second aspect of the present invention, an aseptic package comprises a sterilized food product, and a sterilized pouch in which the sterilized food product is disposed, the sterilized pouch comprising a coextruded multilayer film comprising a core layer comprising polyamide; a first intermediate layer, directly adjacent the core layer, comprising ethylene vinyl alcohol copolymer; a second intermediate layer, directly adjacent the core layer, comprising ethylene vinyl alcohol copolymer; a first outer layer comprising olefinic copolymer or amorphous cyclic olefin copolymer; a second outer layer comprising olefinic copolymer or amorphous cyclic olefin copolymer; a first tie layer adhering the first intermediate layer to the first outer layer; and a second tie layer adhering the second intermediate layer to the second outer layer; wherein the ethylene vinyl alcohol copolymer of the first intermediate layer has an ethylene content, in mole %, at least 5 greater than the ethylene content, in mole %, of the ethylene vinyl alcohol copolymer of the second intermediate layer.

Optionally, according to various embodiments of the second aspect of the invention:
- a second layer comprising a polyamide is disposed between the first intermediate layer and the first tie layer.
- a second layer comprising a polyamide is disposed between the second intermediate layer and the second tie layer.
- a second layer comprising a polyamide is disposed between the first intermediate layer and the first tie layer, and a third layer comprising a polyamide is disposed between the second intermediate layer and the second tie layer.
- the polyamide of the core layer comprises nylon 6.

- the core layer comprises a blend of an amorphous polyamide having a glass transition temperature of at least 80° C., and a semicrystalline polyamide.
- the amorphous cyclic olefin copolymer of at least one of the first and second outer layers is ethylene norbornene copolymer.
- at least one of the first and second outer layers comprises a blend of amorphous cyclic olefin copolymer and semicrystalline olefinic polymer.
- at least one of the first and second outer layers comprises a blend of amorphous cyclic olefin copolymer and a semicrystalline olefinic polymer selected from the group consisting of ethylene polymer, ethylene copolymer, and polypropylene.
- the olefinic polymer, of at least one of the first and second outer layers, is selected from the group consisting of
  a) a blend of low density polyethylene and linear low density polyethylene;
  b) a blend of low density polyethylene and an ethylene/alpha-olefin interpenetrating network resin;
  c) propylene/ethylene copolymer;
  d) high density polyethylene;
  e) propylene homopolymer; and
  f) ethylene/norbornene copolymer.
- the first and second tie layers each comprise an anhydride grafted polymer or ethylene/acrylic acid copolymer.
- the film exhibits an oxygen transmission rate (ASTM D3985) at 15 days of less than 18 such as less than 15, such as less than 12, such as less than 8 cc oxygen/m$^2$·day @ 100% relative humidity inside and outside at 73° F. at one atmosphere.
- the film exhibits an elongation at yield (ASTM D 882) of less than 15%, such as less than 8% in each of the longitudinal and transverse directions.
- at least one of the first and second intermediate layer comprises ethylene vinyl alcohol copolymer in the absence of an oxygen scavenging polymer.
- at least one of the first and second intermediate layer comprises ethylene vinyl alcohol copolymer in the absence of a transition metal catalyst or transition metal salt.
- at least one of the first and second intermediate layer consists essentially of ethylene vinyl alcohol copolymer in the absence of an oxygen scavenging polymer.
- at least one of the first and second intermediate layer consists essentially of ethylene vinyl alcohol copolymer in the absence of a transition metal catalyst or transition metal salt.
- at least one of the first and second intermediate layer comprises ethylene vinyl alcohol copolymer blended with an active oxygen barrier.
- the film is flexible.
- the film is a blown film.
- both intermediate layers are internal layers, each having a film layer on either side thereof.
- the EVOH of the first intermediate layer has an ethylene content of from 27 mole % to 48 mole %;
- the EVOH of the second intermediate layer has an ethylene content of from 22 mole % to 38 mole %.
- the film is not a bottle.
- the package is not a bottle.

In a third aspect of the present invention, a method of making an aseptic package comprises sterilizing a food product; sterilizing a coextruded multilayer film, the film comprising a core layer comprising polyamide; a first intermediate layer, directly adjacent the core layer, comprising ethylene vinyl alcohol copolymer; a second intermediate layer, directly adjacent the core layer, comprising ethylene vinyl alcohol copolymer; a first outer layer comprising olefinic copolymer or amorphous cyclic olefin copolymer; a second outer layer comprising olefinic copolymer or amorphous cyclic olefin copolymer; a first tie layer adhering the first intermediate layer to the first outer layer; and a second tie layer adhering the second intermediate layer to the second outer layer; wherein the ethylene vinyl alcohol copolymer of the first intermediate layer has an ethylene content, in mole %, at least 5 greater than the ethylene content, in mole %, of the ethylene vinyl alcohol copolymer of the second intermediate layer; and wherein the film exhibits an elongation at yield (ASTM D 882) of less than 15% in each of the longitudinal and transverse directions, and a free shrink (ASTM D 2732) at 200° F. of less than 8% in each of the longitudinal and transverse directions; forming the sterilized film into a pouch; filling the pouch with the sterilized food product; and sealing the pouch.

Optionally, according to various embodiments of the third aspect of the invention:

- a second layer comprising a polyamide is disposed between the first intermediate layer and the first tie layer.
- a second layer comprising a polyamide is disposed between the second intermediate layer and the second tie layer.
- a second layer comprising a polyamide is disposed between the first intermediate layer and the first tie layer, and a third layer comprising a polyamide is disposed between the second intermediate layer and the second tie layer.
- the polyamide of the core layer comprises nylon 6.
- the core layer comprises a blend of an amorphous polyamide having a glass transition temperature of at least 80° C., and a semicrystalline polyamide.
- the amorphous cyclic olefin copolymer of at least one of the first and second outer layers is ethylene norbornene copolymer.
- at least one of the first and second outer layer comprises a blend of amorphous cyclic olefin copolymer and semicrystalline olefinic polymer.
- at least one of the first and second outer layer comprises a blend of amorphous cyclic olefin copolymer and a semicrystalline olefinic polymer selected from the group consisting of ethylene polymer, ethylene copolymer, and polypropylene.
- the olefinic polymer, of at least one of the first and second outer layers, is selected from the group consisting of
  a) a blend of low density polyethylene and linear low density polyethylene;
  b) a blend of low density polyethylene and an ethylene/alpha-olefin interpenetrating network resin;
  c) propylene/ethylene copolymer;
  d) high density polyethylene;
  e) propylene homopolymer; and
  f) ethylene/norbornene copolymer.
- the first and second tie layers each comprise an anhydride grafted polymer or ethylene/acrylic acid copolymer.
- the film exhibits an oxygen transmission rate (ASTM D3985) at 15 days of less than 18, such as less than 15, such as less than 12, such as less than 8 cc oxygen/m$^2$·day @ 100% relative humidity inside and outside at 73° F. at one atmosphere.
- the film exhibits an elongation at yield (ASTM D 882) of less than 15%, such as less than 8% in each of the longitudinal and transverse directions.
- at least one of the first and second intermediate layer comprises ethylene vinyl alcohol copolymer in the absence of an oxygen scavenging polymer.

at least one of the first and second intermediate layer comprises ethylene vinyl alcohol copolymer in the absence of a transition metal catalyst or transition metal salt.

at least one of the first and second intermediate layer consists essentially of ethylene vinyl alcohol copolymer in the absence of an oxygen scavenging polymer.

at least one of the first and second intermediate layer consists essentially of ethylene vinyl alcohol copolymer in the absence of a transition metal catalyst or transition metal salt.

at least one of the first and second intermediate layer comprises ethylene vinyl alcohol copolymer blended with an active oxygen barrier.

the film is flexible.

the film is a blown film.

both intermediate layers are internal layers, each having a film layer on either side thereof.

the EVOH of the first intermediate layer has an ethylene content of from 27 mole % to 48 mole %;

the EVOH of the second intermediate layer has an ethylene content of from 22 mole % to 38 mole %.

the film is not a bottle.

the package made from the method is not a bottle.

Definitions

"Active oxygen barrier" ("AOB") herein refers to a composition that is a blend of a thermoplastic resin (a) having carbon-carbon double bonds substantially in its main chain, a transition metal salt (b), and an oxygen barrier polymer (c). In some embodiments the active oxygen barrier composition may also include a compatibilizer (d). The oxygen barrier polymer may comprise about 70 to 99% by weight of the composition, and the thermoplastic resin having carbon-carbon double bonds typically comprises from about 1 to 30 weight % of the polymeric portion of the composition. When present, the compatibilizer typically comprises about 0.1 to 29 weight % of the total polymeric portion of the composition. Suitable active oxygen barrier compositions for some embodiments of the present invention are described in greater detail in U.S. Patent Publication Nos. 2006/0281882 and 2005/0153087, the contents of which are hereby incorporated by reference in their entirety.

"Aseptic" herein refers to a process wherein a sterilized container or packaging material, e.g. a pre-made pouch or a pouch constructed in a vertical form/fill/seal process, is filled with a sterilized food product, in a hygienic environment. The food product is thus rendered shelf stable in normal nonrefrigerated conditions. "Aseptic" is also used herein to refer to the resulting filled and closed package. The package or packaging material, and the food product, are typically separately sterilized before filling.

"Ethylene/alpha-olefin copolymer" (EAO) herein refers to copolymers of ethylene with one or more comonomers selected from $C_3$ to $C_{10}$ alpha-olefins such as propene, butene-1, hexene-1, octene-1, etc. in which the molecules of the copolymers comprise long polymer chains with relatively few side chain branches arising from the alpha-olefin which was reacted with ethylene. This molecular structure is to be contrasted with conventional high pressure low or medium density polyethylenes which are highly branched with respect to EAOs and which high pressure polyethylenes contain both long chain and short chain branches. EAO includes such heterogeneous materials as linear medium density polyethylene (LMDPE), linear low density polyethylene (LLDPE), and very low and ultra low density polyethylene (VLDPE and ULDPE), such as DOWLEX™ and ATTANE™ resins supplied by Dow, and ESCORENE™ resins supplied by Exxon; as well as linear homogeneous ethylene/alpha olefin copolymers (HEAO) such as TAFMER™ resins supplied by Mitsui Petrochemical Corporation, EXACT™ and EXCEED™ resins supplied by Exxon, long chain branched (HEAO) AFFINITY™ resins and ELITE™ resins supplied by the Dow Chemical Company, ENGAGE™ resins supplied by DuPont Dow Elastomers, and SURPASS™ resins supplied by Nova Chemicals.

"Cyclic olefin" herein means a compound containing a polymerizable carbon-carbon double bond that is either contained within an alicyclic ring, e.g., as in norbornene, or linked to an alicyclic ring, e.g., as in vinyl cyclohexane. Polymerization of the cyclic olefin provides a polymer comprising an alicyclic ring as part of or pendant to the polymer backbone.

"Cyclic olefin copolymer" and the like herein (e.g. "cycloolefin copolymer") means a copolymer formed by polymerization of a cyclic olefin with a comonomer. An example of a cyclic olefin copolymer is ethylene/norbornene copolymer, such as that supplied by Ticona under the trademark TOPAS™, by Zeon under the trademark ZEONOR™ and by Mitsui under the trademark APEL™.

"Ethylene homopolymer or copolymer" herein refers to ethylene homopolymer such as low density polyethylene (LDPE); ethylene/alpha olefin copolymer such as those defined herein; ethylene/vinyl acetate copolymer; ethylene/alkyl acrylate copolymer; ethylene/(meth) acrylic acid copolymer; or ionomer resin.

"High density polyethylene" is an ethylene homopolymer or copolymer with a density of 0.940 g/cc or higher.

"Internal" herein refers to a layer bounded on both of its major surfaces with another layer.

"Multicomponent ethylene/alpha-olefin interpenetrating network resin" or "IPN resin" herein refers to multicomponent molecular mixtures of polymer chains. Because of molecular mixing, IPN resins cannot be separated without breaking chemical bonds. Polymer chains combined as IPN resins are interlaced at a molecular level and are thus considered true solid state solutions. Interpenetrating networks, unlike blends, become new compositions exhibiting properties distinct from parent constituents. Interpenetrating networks provide phase co-continuity leading to surprising enhancement of physical properties. Due to the mixture of at least two molecular types, these compositions may exhibit bimodal or multimodal curves when analyzed using TREF or CRYSTAF. Interpenetrating networks as herein used includes semi-interpenetrating networks and therefore describes crosslinked and uncrosslinked multicomponent molecular mixtures having a low density fraction and a high density fraction.

"Olefinic" and the like herein refer to a polymer or copolymer derived at least in part from an olefinic monomer.

"OTR" herein refers to oxygen transmission rate as defined herein.

"Polyamide" herein refers to polymers having amide linkages along the molecular chain, and preferably to synthetic polyamides such as nylons.

"Polymer" and the like herein mean a homopolymer, but also copolymers thereof, including bispolymers, terpolymers, etc.

"Polypropylene" is a propylene homopolymer or copolymer having greater than 50 mole percent propylene prepared by conventional heterogeneous Ziegler-Natta type initiators or by single site catalysis. Propylene copolymers are typically prepared with ethylene or butene comonomers.

All compositional percentages used herein are presented on a "by weight" basis, unless designated otherwise; except that compositional percentages for the ethylene content of EVOH herein is given on a mole % basis.

DETAILED DESCRIPTION OF THE INVENTION

The Aseptic Process

Aseptic packaging typically involves the sterilization of liquid foods and beverages outside the package, and separate sterilization of the packaging material, to produce a shelf stable package. Ultra high temperature is used to rapidly heat the food product, followed by cooling of the product, before the product is put into the pouch or other container formed from the packaging material. Processing times for the product are generally 3 to 15 seconds; temperatures range from about 195° F. to 285° F.

Film Sterilization

An example of a commercially available aseptic form/fill/seal equipment system is the Flavour Mark™ Aseptic 3-sided Fin Seal system having a film sterilization section including a tank for hydrogen peroxide, a drying chamber, a form/fill/seal section, and a unit which supplies and circulates hydrogen peroxide and controls temperature, air pressure etc. Film is continuously sterilized by hydrogen peroxide set at a temperature of between 60° C. and 80° C. in a chemical tank. After film leaves this tank, hot air at a temperature of between 60° C. and 80° C. is used to dry out the film to remove hydrogen peroxide from the film. Temperature and flow level for the hydrogen peroxide is controlled by steam to raise temperature, and water is supplied for cooling. Piping between the food sterilizer and the packaging unit can be initially sterilized using steam heat or hot water. After film exits the peroxide tank, the film is scraped by plates and by an air knife to make it easy to dry.

Film Embodiments of the Invention

A representative film structure of some embodiments of the invention is as follows:

| Polyolefin or Amorphous COC | $1^{st}$ Tie | 1st EVOH | nylon | 2nd EVOH | $2^{nd}$ Tie | Polyolefin or Amorphous COC |
|---|---|---|---|---|---|---|
| A | B | C | D | E | F | G |

Core layer D of the above film structure comprises or consists essentially of any suitable polyamide, such as a semicrystalline polyamide such as nylon 6.

In some embodiments, core layer D can comprise or consisting essentially of a blend of an amorphous polyamide and a semicrystalline polyamide in which the amorphous polyamide can comprise any suitable percent of the overall polyamide blend, e.g. less than 50 wt. %, such as less than 40 wt. %, and less than 30 wt. % of the polyamide blend. The amorphous polyamide can comprise from 5 to 45 wt. %, such as from 20 to 40 wt. %, such as from 25 to 35 wt. % of the polyamide blend. Useful commercially available amorphous polyamides include FE4494™ and FE4495™. These are PA6I/66/69 polyamides available from EMS. Also useful is FE7103™, a PA6I/MXDI polyamide available from EMS. Other amorphous polyamides that can be used are PA66/6T; PA66/6I; PA66I/66T; PA6/6T; and PA6/6I. Also useful is PA6/3/T available from Degussa as TROGAMID™, and PA6I/6T available from DuPont as SELAR™ PA 3426. The amorphous polyamide has in one embodiment a glass transition temperature of at least 80° C. The semicrystalline polyamide can be any suitable polyamide, including nylon 6. The semicrystalline polyamide can comprise any suitable percent of the overall polyamide blend, and can comprise e.g. more than 50 wt. %, such as more than 60 wt. %, and more than 70 wt. % of the polyamide blend. The semicrystalline polyamide can comprise from 55 to 95 wt. %, such as from 60 to 80 wt. %, such as from 65 to 75 wt. % of the polyamide blend. The semicrystalline polyamide in one embodiment has a glass transition temperature of at least 55° C.

Intermediate layers C and E each comprise or consist essentially of EVOH.

The EVOH compositions of layers C and E differ at least in that the ethylene vinyl alcohol copolymer of the first intermediate layer (layer C) has an ethylene content, in mole %, at least 5 greater than the ethylene content, in mole %, of the ethylene vinyl alcohol copolymer of the second intermediate layer (layer E). For example, if the EVOH of layer E has an ethylene content of 27 mole %, the EVOH of layer C has an ethylene content of at least 32 mole %. In some embodiments, the EVOH of layer C has an ethylene content of at least 27 mole %, such as from 27 mole % to 44 mole %, 30 to 44 mole %, 27 to 38 mole %, 27 to 35 mole %, 35 to 44 mole %, 38 to 44 mole %, 35 to 38 mole %, or values intermediate any of the above values.

In some embodiments, the EVOH of layer E has an ethylene content of at least 22 mole %, such as from 22 mole % to 44 mole %, 25 to 44 mole %, 27 to 38 mole %, 27 to 35 mole %, 35 to 44 mole %, 38 to 44 mole %, 35 to 38 mole %, or values intermediate any of the above values, or less than 30 mole %, or less than 29 mole %, or from 22 to 30 mole %, or from 22 to 29 mole %, or from 22 to 28 mole %, or from 22 to 27 mole %.

In one embodiment, at least one of the first and second intermediate layers comprises or consists essentially of ethylene vinyl alcohol copolymer in the absence of an oxygen scavenging polymer.

In another embodiment, at least one of the first and second intermediate layer comprises or consists essentially of ethylene vinyl alcohol copolymer blended with an active oxygen barrier.

Tie layers B and F can comprise any suitable polymeric adhesive that functions to bond two layers together. Materials that can be used in embodiments of the present invention include e.g. ethylene/vinyl acetate copolymer; anhydride grafted ethylene/vinyl acetate copolymer; anhydride grafted ethylene/alpha olefin copolymer; anhydride grafted polypropylene; anhydride grafted low density polyethylene; ethylene/methyl acrylate copolymer; anhydride grafted high density polyethylene, ionomer resin, ethylene/acrylic acid copolymer; ethylene/methacrylic acid copolymer; and anhydride grafted ethylene/methyl acrylate copolymer. A suitable anhydride can be maleic anhydride. Tie layers B and F can be the same, or can differ. The choice of tie layers depends at least in part on the choice of polymer for the outer layers A and G respectively. In one embodiment, tie layer B directly adheres first outer layer A to first intermediate layer C, and tie layer F directly adheres second outer layer G to second intermediate layer E. In other embodiments:

a layer (H) comprising a polyamide is disposed between tie layer B and first intermediate layer C, such that tie layer B indirectly adheres first intermediate layer C to first outer layer A. Thus:

| Polyolefin or aCOC | 1st Tie | 2nd nylon layer | 1st EVOH | 2nd nylon | 2nd EVOH | 2nd Tie | Polyolefin or aCOC |
|---|---|---|---|---|---|---|---|
| A | B | H | C | D | E | F | G | a layer (J) comprising a polyamide is disposed between tie layer F and second intermediate layer E, such that tie layer F indirectly adheres second intermediate layer E to second outer layer G. Thus:

| Polyolefin or aCOC | 1st Tie | 1st EVOH | 2nd nylon | 2nd EVOH | 2nd nylon layer | 2nd Tie | Polyolefin or aCOC |
|---|---|---|---|---|---|---|---|
| A | B | C | D | E | J | F | G | a layer (H) comprising a polyamide is disposed between tie layer B and first intermediate layer C, such that tie layer B indirectly adheres first intermediate layer C to first outer layer A; and a layer (J) comprising a polyamide is disposed between tie layer F and second intermediate layer E, such that tie layer F indirectly adheres second intermediate layer E to second outer layer G. Thus:

| Polyolefin or aCOC | 1st Tie | 2nd nylon layer | 1st EVOH | 2nd nylon | 2nd EVOH | 3rd nylon layer | 2nd Tie | Polyolefin or aCOC |
|---|---|---|---|---|---|---|---|---|
| A | B | H | C | D | E | J | F | G |

The polyamide of these other embodiments can be the same as, or different than, the polyamide of the core layer. Any of the polyamides disclosed herein for the core layer can be used for the additional polyamide layer(s). Such additional polyamide layer(s) can be coextruded with the rest of the film structure.

Layer A will typically function as a sealant layer of the film. This layer can comprise one or more semicrystalline olefinic polymers. Polymers that may be used for the layer A include ethylene polymer or copolymer, ethylene/alpha olefin copolymer, ethylene/vinyl acetate copolymer, ionomer resin, ethylene/acrylic or methacrylic acid copolymer, ethylene/acrylate or methacrylate copolymer, low density polyethylene, high density polyethylene, propylene homopolymer, propylene/ethylene copolymer, or blends of any of these materials.

Alternatively, layer A can comprise a material as defined herein for layer G.

Layer G comprises an amorphous cyclic olefin copolymer (aCOC).

Layer G comprises in one embodiment a blend of a) amorphous cyclic olefin copolymer, and (b) semicrystalline olefinic polymer.

The aCOC of layer G is characterized by a glass transition temperature (Tg) of greater than about 30° C., such as between 60° C. and 160° C., between 65° C. and 140° C., and between 70° C. and 120° C. Examples of such materials include ethylene/norbornene copolymer (ENB), recently available from Topas Advance Polymers under the trademark TOPAS™. Various grades are available, including (with glass transition temperature indicated in parenthesis) TKX-0001™ (136° C.), 5010L™ (110° C.), 5013S™ (136° C.), 6013F™ (140° C.), 6015S™ (160° C.), 6017S™ (180° C.), 9506X1™ (68° C. reported/33° C. measured), and 8007 F-04™ (80° C.).

Other cyclic olefin copolymers are available from Mitsui under the trademark APEL™. Various grades are available, including (with glass transition temperature indicated in parenthesis) 8008T™ (70° C.), 6509T™ (80° C.), 6011T™ (115° C.), 6013T™ (135° C.), 6015T™ (155° C.), and 6014D™ (147° C.).

In one embodiment, layer G can comprise one outermost layer of the film such that when formed into a pouch, layer G comprises the layer furthest from the packaged product; and an olefinic polymer or copolymer such as ethylene/alpha olefin copolymer (EAO) can comprise the inner layer A of the film, such that when formed into a pouch, the EAO comprises the layer closest to the packaged product. In this embodiment, the film can be lap sealed, for example a longitudinal lap seal running the length of the pouch, such that layer G is sealed to the EAO inner layer A. This embodiment provides a longitudinally lap sealed pouch.

Pouches made from the film of the present invention can be fin sealed or lap sealed (typically referring to the longitudinal seal running the length of the pouch) depending on the desired configuration of the finished pouch, the equipment used, and the composition of the two outer layers. In the case of fin seals, where the same layer A is sealed to itself at the longitudinal edges of the material web, in one embodiment the outer layer that will come together to form the fin seal comprises a material with a melting point of at least 125° C., e.g. high density polyethylene or propylene homopolymer.

Additional materials that can be incorporated into one or both of the outer layers of the film, and in other layers of the film as appropriate, include antiblock agents, slip agents, antifog agents, etc.

Other additives can also be included in the composition to impart properties desired for the particular article being manufactured. Such additives include, but are not necessarily limited to, fillers, pigments, dyestuffs, antioxidants, stabilizers, processing aids, plasticizers, fire retardants, UV absorbers, etc.

Additional materials, including polymeric materials or other organic or inorganic additives, can be added to layers A and G as needed.

In general, the film can have any total thickness desired, and each layer can have any thickness desired, so long as the film provides the desired properties for the particular packaging operation in which the film is used. Typical total thicknesses are from 0.5 mils to 15 mils, such as 1 mil to 12 mils, such as 2 mils to 10 mils, 3 mils to 8 mils, and 4 mils to 6 mils.

EXAMPLES

Several film structures in accordance with the invention, and comparatives, are identified below. Materials are identified in Table 1.

TABLE 1

Resin Identification

| Material Code | Tradename Or Designation | Source(s) |
|---|---|---|
| AB1 | 502835 ™ | Ampacet |
| AB2 | 10850 ™ | Ampacet |
| AD1 | PX3236 ™ | LyondellBasell |
| AD2 | PX3410 ™ | LyondellBasell |
| AOB1 | EVAL ™ XEP-1185 | EVALCA/Kuraray |
| CM1 | 161159-A ™ | Ampacet |

TABLE 1-continued

Resin Identification

| Material Code | Tradename Or Designation | Source(s) |
|---|---|---|
| EN1 | TOPAS 8007 F-04 ™ | Topas Advance Polymers |
| OB1 | EVAL ™ L171B | Evalca |
| OB2 | SOARNOL ™ AT4403 | Nippon Gohsei |
| OB3 | SOARNOL ™ DT2904RB | Nippon Gohsei |
| OB4 | SOARNOL ™ DC3203F | Nippon Gohsei |
| OB5 | SOARNOL ™ ET3803 | Nippon Gohsei |
| OB6 | SOARNOL ™ SGN017 | Nippon Gohsei |
| OB7 | SOARNOL ™ V250VR | Nippon Gohsei |
| OB8 | EVAL ™ M100 | Evalca |
| PA1 | ULTRAMID ™B40LN01 | BASF |
| PA2 | ULTRAMID ™B33LN01 | BASF |
| PE1 | ELITE ™ 5400 G | Dow |
| PE2 | DOW ™2045.04 | Dow |
| PE3 | 662I ™ | Dow |
| PE4 | T50-200-178 ™ | Ineos |
| PE5 | DMDA-8904 NT7 ™ | Dow |
| PE6 | ATTANE ™ 4203 | Dow |
| PE7 | EXCEED ™ 1012 CJ | ExxonMobil |
| PE8 | EXACT ™ 3132 | ExxonMobil |
| PE9 | KRATON ™ G1643M | Kraton Polymers |
| PE10 | CV77525 ™ | Westlake Chemical |
| PE11 | EB 403AQ ™ | Westlake Chemical |
| PD1 | 100458 ™ | Ampacet |

AB1 is a masterbatch having about 80%, by weight of the masterbatch, of FORTIFLEX ™ T60-500-119, a high density polyethylene with a density of 0.961 grams/cc; about 16%, by weight of the masterbatch, of SILTON JC30A ™, a sodium calcium aluminum silicate, NaCaAl(Si$_2$O$_7$); and about 4 w %, by weight of the masterbatch, of CLEAR Block80 ™ talc, an antiblocking agent.

AB2 is a masterbatch having about 86% linear low density polyethylene, about 13% of an antiblocking agent (diatomaceous earth), and about 1% erucamide.

AD1 is a maleic anhydride-modified linear low density polyethylene with a density of 0.921 grams/cc.

AD2 is a maleic anhydride-modified linear low density polyethylene.

AOB1 is an oxygen scavenging EVOH. It includes an EVOH (EVAL ™ F171B) compounded with an oxygen scavenging resin having carbon-carbon double bonds substantially in its main chain, and a transition metal (cobalt) salt as a catalyst.

CM1 is a masterbatch of a blue pigment in a blend of LLDPE and LDPE.

EN1 is an ethylene/norbornene copolymer with a norbornene content of 36 mole % of the copolymer and a Tg of 80° C.

OB1 is an ethylene/vinyl alcohol copolymer with 27 mole % ethylene.

OB2 is an ethylene/vinyl alcohol copolymer with 44 mole % ethylene.

OB3 is an ethylene/vinyl alcohol copolymer with 29 mole % ethylene.

OB4 is an ethylene/vinyl alcohol copolymer with 32 mole % ethylene.

OB5 is an ethylene/vinyl alcohol copolymer with 38 mole % ethylene.

OB6 is an ethylene/vinyl alcohol copolymer with 27 mole % ethylene.

OB7 is an ethylene/vinyl alcohol copolymer with 25 mole % ethylene.

OB8 is an ethylene/vinyl alcohol copolymer with 24 mole % ethylene.

PA1 is a nylon 6 (poly(caprolactam)).

PA2 is a nylon 6 (poly(caprolactam)).

PE1 is an IPN resin with a density of 0.917 grams/cc, and a melt flow index of 1.0.

PE2 is an ethylene/octene-1 copolymer with a 6.5 weight % octene content, and a density of 0.920 grams/cc.

PE3 is a low density polyethylene resin.

PE4 is an ethylene/1-butene copolymer resin with a density of 0.952 grams/cc.

PE5 is a high density polyethylene with a density of 0.952 grams/cc.

PE6 is a Ziegler/Natta catalyzed ethylene/1-octene copolymer resin with a density of 0.905 grams/cc, and having an octene comonomer content of 11.5% by weight.

PE7 is a single-site catalyzed ethylene/1-hexene copolymer with a density of 0.912 grams/cc.

PE8 is a single-site catalyzed ethylene/1-hexene copolymer with a density of 0.900 grams/cc.

PE9 is an SEBS (styrene ethylene butylene styrene copolymer) having about 20% by weight styrene moiety, and about 80% by weight rubber moiety.

PE10 is a Ziegler/Natta catalyzed ethylene/1-hexene copolymer with a density of 0.906 grams/cc.

PE11 is a low density polyethylene resin with about 0.25% antiblock.

PD1 is a processing aid, comprising a fluoropolymer in linear low density polyethylene.

In Table 2, the films of Comparatives 1 and 2, and Examples 1 to 10, were made by otherwise conventional coextrusion techniques. Examples 11 and 12 are prophetic examples.

TABLE 2

Film structures

| Example | A | B | C | D | E | F | G |
|---|---|---|---|---|---|---|---|
| Comp. 1 | 8% AB1 + 22% PE3 + 70% PE2 | AD2 | PA1 | OB1 | PA1 | AD2 | 60% EN1 + 15% PE4 + 20% PE1 + 5% AB1 |
| Mils | 1.93 | 0.28 | 0.55 | 0.55 | 0.55 | 1.1 | 0.55 |
| Vol % | 35.0 | 5.0 | 10.0 | 10.0 | 10.0 | 20.0 | 10.0 |
| Comp. 2 | 8% AB1 + 22% PE3 + 70% PE2 | AD1 | PA2 | 75% OB1 + 25% OB2 | PA2 | AD1 | 60% EN1 + 15% PE4 + 20% PE1 + 5% AB1 |
| Mils | 1.93 | 0.28 | 0.55 | 0.83 | .55 | 0.83 | 0.55 |
| Vol % | 35.0 | 5.0 | 10.0 | 15.0 | 10.0 | 15.0 | 10.0 |
| Ex. 1 | 8% AB1 + 22% PE3 + 70% PE2 | 80% AD1 + 20% PE1 | OB4 | PA1 | OB1 | 80% AD1 + 20% PE1 | 60% EN1 + 15% PE5 + 20% PE1 + 5% AB1 |
| Mils | 1.92 | 0.61 | 0.41 | 1.1 | 0.42 | 0.60 | 0.44 |
| Vol % | 35.0 | 11.0 | 7.5 | 20.0 | 7.5 | 11.0 | 8.0 |
| Ex. 2 | 8% AB1 + 22% PE3 + 70% PE2 | 80% AD1 + 20% PE1 | OB5 | PA1 | OB1 | 80% AD1 + 20% PE1 | 60% EN1 + 15% PE5 + 20% PE1 + 5% AB1 |
| Mils | 1.92 | 0.61 | 0.41 | 1.1 | 0.42 | 0.60 | 0.44 |
| Vol % | 35.0 | 11.0 | 7.5 | 20.0 | 7.5 | 11.0 | 8.0 |
| Ex. 3 | 8% AB1 + 22% PE3 + 70% PE2 | 80% AD1 + 20% PE1 | OB2 | PA1 | OB1 | 80% AD1 + 20% PE1 | 60% EN1 + 15% PE5 + 20% PE1 + 5% AB1 |
| Mils | 1.92 | 0.61 | 0.41 | 1.1 | 0.42 | 0.60 | 0.44 |
| Vol % | 35.0 | 11.0 | 7.5 | 20.0 | 7.5 | 11.0 | 8.0 |

TABLE 2-continued

Film structures

| | | | | Layers | | | |
|---|---|---|---|---|---|---|---|
| Example | A | B | C | D | E | F | G |
| Ex. 4 | 8% AB1 + 22% PE3 + 70% PE2 | 80% AD1 + 20% PE1 | OB2 | PA1 | OB6 | 80% AD1 + 20% PE1 | 60% EN1 + 15% PE5 + 20% PE1 + 5% AB1 |
| Mils | 1.92 | 0.61 | 0.41 | 1.1 | 0.42 | 0.60 | 0.44 |
| Vol % | 35.0 | 11.0 | 7.5 | 20.0 | 7.5 | 11.0 | 8.0 |
| Ex. 5 | 8% AB1 + 22% PE3 + 70% PE2 | 80% AD1 + 20% PE1 | OB5 | PA1 | OB6 | 80% AD1 + 20% PE1 | 60% EN1 + 15% PE5 + 20% PE1 + 5% AB1 |
| Mils | 1.92 | 0.61 | 0.41 | 1.1 | 0.42 | 0.60 | 0.44 |
| Vol % | 35.0 | 11.0 | 7.5 | 20.0 | 7.5 | 11.0 | 8.0 |
| Ex. 6 | 8% AB1 + 22% PE3 + 70% PE2 | 80% AD1 + 20% PE1 | OB4 | PA1 | OB6 | 80% AD1 + 20% PE1 | 60% EN1 + 15% PE5 + 20% PE1 + 5% AB1 |
| Mils | 1.92 | 0.61 | 0.41 | 1.1 | 0.42 | 0.60 | 0.44 |
| Vol % | 35.0 | 11.0 | 7.5 | 20.0 | 7.5 | 11.0 | 8.0 |
| Ex. 7 | 8% AB1 + 20% PE3 + 72% PE2 | 80% AD1 + 16% PE1 + 4% CM1 | OB5 | PA1 | OB6 | 80% AD1 + 16% PE1 + 4% CM1 | 60% EN1 + 15% PE5 + 20% PE1 + 5% AB1 |
| Mils | 1.92 | 0.61 | 0.41 | 1.1 | 0.42 | 0.60 | 0.44 |
| Vol % | 35.0 | 11.0 | 7.5 | 20.0 | 7.5 | 11.0 | 8.0 |
| Ex. 8 | 8% AB1 + 22% PE3 + 70% PE2 | 80% AD1 + 20% PE1 | OB5 | PA1 | OB7 | 80% AD1 + 20% PE1 | 60% EN1 + 15% PE5 + 20% PE1 + 5% AB1 |
| Mils | 1.92 | 0.61 | 0.41 | 1.1 | 0.42 | 0.60 | 0.44 |
| Vol % | 35.0 | 11.0 | 7.5 | 20.0 | 7.5 | 11.0 | 8.0 |
| Ex. 9 | 8% AB1 + 22% PE3 + 70% PE2 | 80% AD1 + 20% PE1 | OB5 | PA1 | OB8 | 80% AD1 + 20% PE1 | 60% EN1 + 15% PE5 + 20% PE1 + 5% AB1 |
| Mils | 1.92 | 0.61 | 0.41 | 1.1 | 0.42 | 0.60 | 0.44 |
| Vol % | 35.0 | 11.0 | 7.5 | 20.0 | 7.5 | 11.0 | 8.0 |
| Ex. 10 | 8% AB1 + 22% PE3 + 70% PE6 | 80% AD1 + 20% PE7 | OB5 | PA1 | OB6 | 80% AD1 + 20% PE7 | 60% EN1 + 15% PE5 + 20% PE7 + 5% AB1 |
| Mils | 1.65 | 0.28 | 0.41 | 1.21 | 0.41 | 1.21 | 0.33 |
| Vol % | 30.0 | 5.0 | 7.5 | 22.0 | 7.5 | 22.0 | 6.0 |
| Ex. 11 | 8% AB1 + 22% PE3 + 70% PE6 | 80% AD1 + 20% PE7 | 70% OB5 30% AOB1 | PA1 | 70% OB6 30% AOB1 | 80% AD1 + 20% PE7 | 60% EN1 + 15% PE5 + 20% PE7 + 5% AB1 |
| Mils | 1.65 | 0.28 | 0.33 | 1.27 | 0.33 | 1.32 | 0.33 |
| Vol % | 30.0 | 5.0 | 6.0 | 23.0 | 6.0 | 24.0 | 6.0 |
| Ex. 12 | 8% AB1 + 22% PE3 + 70% PE2 | 80% AD1 + 20% PE8 | OB5 | PA1 | OB6 | 80% AD1 + 20% PE8 | 60% EN1 + 15% PE5 + 20% PE1 + 5% AB1 |
| Mils | 1.76 | 0.275 | 0.42 | 1.10 | 0.42 | 1.10 | 0.44 |
| Vol % | 32.0 | 5.0 | 7.5 | 20.0 | 7.5 | 20.0 | 8.0 |
| Ex. 13 | 8% AB1 + 22% PE3 + 70% PE2 | 80% AD1 + 20% PE7 | OB5 | PA1 | OB6 | 80% AD1 + 20% PE7 | 60% EN1 + 15% PE5 + 20% PE1 + 5% AB1 |
| Mils | 1.76 | 0.275 | 0.42 | 1.10 | 0.42 | 1.10 | 0.44 |
| Vol % | 32.0 | 5.0 | 7.5 | 20.0 | 7.5 | 20.0 | 8.0 |
| Ex. 14 | 8% AB1 + 22% PE3 + 70% PE2 | 80% AD1 + 20% PE9 | OB5 | PA1 | OB6 | 80% AD1 + 20% PE9 | 60% EN1 + 15% PE5 + 20% PE1 + 5% AB1 |
| Mils | 1.76 | 0.275 | 0.42 | 1.10 | 0.42 | 1.10 | 0.44 |
| Vol % | 32.0 | 5.0 | 7.5 | 20.0 | 7.5 | 20.0 | 8.0 |
| Ex. 15 | 8% AB1 + 22% PE3 + 70% PE6 | 80% AD1 + 20% PE9 | OB5 | PA1 | OB6 | 80% AD1 + 20% PE9 | 60% EN1 + 15% PE5 + 20% PE1 + 5% AB1 |
| Mils | 1.76 | 0.275 | 0.42 | 1.10 | 0.42 | 1.10 | 0.44 |
| Vol % | 32.0 | 5.0 | 7.5 | 20.0 | 7.5 | 20.0 | 8.0 |
| Ex. 16 | 8% AB1 + 22% PE3 + | 80% AD1 + 20% PE7 | OB5 | PA1 | OB6 | 80% AD1 + 20% PE7 | 60% EN1 + 15% PE5 + |

TABLE 2-continued

| | | | Film structures | | | | |
|---|---|---|---|---|---|---|---|
| | | | | Layers | | | |
| Example | A | B | C | D | E | F | G |
| | 70% PE6 | | | | | | 20% PE1 + 5% AB1 |
| Mils | 1.76 | 0.275 | 0.42 | 1.10 | 0.42 | 1.10 | 0.44 |
| Vol % | 32.0 | 5.0 | 7.5 | 20.0 | 7.5 | 20.0 | 8.0 |
| Ex. 17 | 8% AB1 + 22% PE3 + 70% PE6 | 80% AD1 + 20% PE7 | 70% OB5 + 30% AOB1 | PA1 | 70% OB6 + 30% AOB1 | 80% AD1 + 20% PE7 | 60% EN1 + 15% PE5 + 20% PE1 + 5% AB1 |
| Mils | 1.76 | 0.275 | 0.42 | 1.10 | 0.42 | 1.10 | 0.44 |
| Vol % | 32.0 | 5.0 | 7.5 | 20.0 | 7.5 | 20.0 | 8.0 |
| Ex. 18 | 8% AB1 + 22% PE3 + 70% PE2 | 80% AD1 + 20% PE7 | 70% OB5 + 30% AOB1 | PA1 | 70% OB6 + 30% AOB1 | 80% AD1 + 20% PE7 | 60% EN1 + 15% PE5 + 20% PE1 + 5% AB1 |
| Mils | 1.76 | 0.275 | 0.42 | 1.10 | 0.42 | 1.10 | 0.44 |
| Vol % | 32.0 | 5.0 | 7.5 | 20.0 | 7.5 | 20.0 | 8.0 |
| Ex. 19 | 8% AB1 + 22% PE3 + 70% PE2 | 80% AD1 + 20% PE1 | OB5 | PA1 | OB8 | 80% AD1 + 20% PE1 | 60% EN1 + 15% PE5 + 20% PE1 + 5% AB1 |
| Mils | 1.76 | 0.275 | 0.42 | 1.10 | 0.42 | 1.10 | 0.44 |
| Vol % | 32.0 | 5.0 | 7.5 | 20.0 | 7.5 | 20.0 | 8.0 |
| Ex. 20 | 8% AB1 + 22% PE3 + 70% PE6 | 80% AD1 + 20% PE6 | OB5 | PA1 | OB6 | 80% AD1 + 20% PE6 | 60% EN1 + 15% PE5 + 20% PE6 + 5% AB1 |
| Mils | 1.65 | 0.275 | 0.42 | 1.21 | 0.42 | 1.21 | 0.33 |
| Vol % | 30.0 | 5.0 | 7.5 | 22.0 | 7.5 | 22.0 | 6.0 |
| Ex. 21 | 8% AB1 + 22% PE3 + 70% PE6 | 80% AD1 + 20% PE10 | OB5 | PA1 | OB6 | 80% AD1 + 20% PE10 | 60% EN1 + 15% PE5 + 20% PE10 + 5% AB1 |
| Mils | 1.65 | 0.275 | 0.42 | 1.21 | 0.42 | 1.21 | 0.33 |
| Vol % | 30.0 | 5.0 | 7.5 | 22.0 | 7.5 | 22.0 | 6.0 |
| Ex. 22 | 8% AB1 + 22% PE3 + 70% PE6 | 80% AD1 + 20% PE7 | 70% OB5 + 30% AOB1 | PA1 | 70% OB1 + 30% AOB1 | 80% AD1 + 20% PE7 | 8% AB1 + 22% PE3 + 70% PE6 |
| Mils | 1.23 | 0.55 | 0.33 | 1.27 | 0.33 | 0.55 | 1.24 |
| Vol % | 22.5 | 10.0 | 6.0 | 23.0 | 6.0 | 10.0 | 22.5 |
| Ex. 23 | 8% AB1 + 22% PE3 + 70% PE6 | 80% AD1 + 20% PE7 | OB5 | PA1 | OB1 + | 80% AD1 + 20% PE7 | 8% AB1 + 22% PE3 + 70% PE6 |
| Mils | 1.23 | 0.46 | 0.42 | 1.27 | 0.42 | 0.47 | 1.24 |
| Vol % | 22.5 | 8.5 | 7.5 | 23.0 | 7.5 | 8.5 | 22.5 |
| Comp. 3 | 8% AB1 + 22% PE3 + 70% PE6 | 80% AD1 + 20% PE7 | PA1 | OB1 | PA1 | 80% AD1 + 20% PE7 | 8% AB1 + 22% PE3 + 70% PE6 |
| Mils | 1.37 | 0.55 | 0.55 | 0.55 | 0.55 | 0.55 | 1.38 |
| Vol % | 25.0 | 10.0 | 10.0 | 10.0 | 10.0 | 10.0 | 25.0 |
| Ex. 24 | 8% AB1 + 22% PE3 + 70% PE6 | 80% AD1 + 20% PE7 | OB5 | PA1 | OB6 | 77.5% AD1 + 18% PE7 + 4.5% CM1 | 60% EN1 + 15% PE5 + 20% PE7 + 5% AB1 |
| Mils | 1.65 | 0.275 | 0.42 | 1.21 | 0.42 | 1.21 | 0.33 |
| Vol % | 30.0 | 5.0 | 7.5 | 22.0 | 7.5 | 22.0 | 6.0 |
| Ex. 25 | 8% AB1 + 22% PE3 + 70% PE7 | 80% AD1 + 20% PE7 | OB5 | PA1 | OB6 | 77.5% AD1 + 18% PE7 + 4.5% CM1 | 60% EN1 + 15% PE5 + 20% PE7 + 5% AB1 |
| Mils | 1.65 | 0.275 | 0.42 | 1.21 | 0.42 | 1.21 | 0.33 |
| Vol % | 30.0 | 5.0 | 7.5 | 22.0 | 7.5 | 22.0 | 6.0 |
| Ex. 26 | 8% AB1 + 22% PE3 + 70% PE7 | 80% AD1 + 20% PE7 | OB5 | PA1 | OB6 | 80% AD1 + 20% PE7 | 60% EN1 + 15% PE5 + 20% PE7 + 5% AB1 |
| Mils | 1.65 | 0.275 | 0.42 | 1.21 | 0.42 | 1.21 | 0.33 |
| Vol % | 30.0 | 5.0 | 7.5 | 22.0 | 7.5 | 22.0 | 6.0 |
| Ex. 27 | 8% AB1 + 22% PE3 + 70% PE6 | 80% AD1 + 20% PE7 | 85% OB5 + 15% AOB1 | PA1 | 85% OB6 + 15% AOB1 | 80% AD1 + 20% PE7 | 60% EN1 + 15% PE5 + 20% PE7 + 5% AB1 |
| Mils | 1.65 | 0.275 | 0.33 | 1.21 | 0.33 | 1.38 | 0.33 |
| Vol % | 30.0 | 5.0 | 6.0 | 22.0 | 6.0 | 25.0 | 6.0 |
| Ex. 28 | 8% AB1 + | 80% AD1 + | 55% OB5 + | PA1 | 55% OB6 + | 80% AD1 + | 60% EN1 + |

TABLE 2-continued

Film structures

| Example | A | B | C | D | E | F | G |
|---|---|---|---|---|---|---|---|
| | 22% PE3 + 70% PE6 | 20% PE7 | 45% AOB1 | | 45% AOB1 | 20% PE7 | 15% PE5 + 20% PE7 + 5% AB1 |
| Mils | 1.65 | 0.275 | 0.33 | 1.21 | 0.33 | 1.38 | 0.33 |
| Vol % | 30.0 | 5.0 | 6.0 | 22.0 | 6.0 | 25.0 | 6.0 |
| Ex. 29 | 8% AB1 + 22% PE3 + 70% PE6 | 80% AD1 + 20% PE7 | 40% OB5 + 60% AOB1 | PA1 | 40% OB6 + 60% AOB1 | 80% AD1 + 20% PE7 | 60% EN1 + 15% PE5 + 20% PE7 + 5% AB1 |
| Mils | 1.65 | 0.275 | 0.33 | 1.21 | 0.33 | 1.38 | 0.33 |
| Vol % | 30.0 | 5.0 | 6.0 | 22.0 | 6.0 | 25.0 | 6.0 |
| Ex. 30 | 5% AB2 + 25% PE11 + 69% PE2 + 1% PD1 | AD1 | OB5 | PA2 | OB6 | AD1 | 5% AB2 + 25% PE11 + 69% PE2 + 1% PD1 |
| Mils | 1.38 | 0.55 | 0.28 | 1.10 | 0.28 | 0.55 | 1.38 |
| Vol % | 25.0 | 10.0 | 5.0 | 20.0 | 5.0 | 10.0 | 25.0 |

All of examples 1 to 30 and comparative examples 1 to 3 were made by otherwise conventional coextrusion techniques.

TABLE 3

Oxygen Transmission Rates
cc oxygen (STP)/m$^2$ · day @ 73° F. and 100% relative humidity inside and outside (ASTM D3985)

| Day | Comp. 1 | Comp. 2 | EX. 1 | EX. 2 | EX. 3 | EX. 4 | EX. 5 | EX. 6 |
|---|---|---|---|---|---|---|---|---|
| 1 | 1.2 | 0.8 | 1.1 | 1.1 | 0.97 | 0.77 | 0.7 | 0.57 |
| 2 | 1.8 | 1.2 | 1.2 | 1.3 | 1.3 | 1.1 | 0.97 | 0.87 |
| 3 | 2 | 2.0 | 1.3 | 1.3 | 1.6 | 1.2 | 0.97 | 0.97 |
| 4 | 3.3 | 4.5 | 1.76 | 1.8 | 1.7 | 1.5 | 1.1 | 0.97 |
| 5 | 3.6 | 4.9 | 2.43 | 1.87 | 1.87 | 1.83 | 1.23 | 1.23 |
| 6 | 5.5 | 5.9 | 1.83 | 1.53 | 2.97 | 1.63 | 0.87 | 0.97 |
| 7 | 8.1 | 5.7 | 2.3 | 2.87 | 4.03 | 4.83 | 1.43 | 1.03 |
| 8 | 10.1 | 9.1 | 3 | 4 | 5.33 | 3.67 | 2.3 | 1.33 |
| 9 | 11.4 | 11 | 4.8 | 4.9 | 6.3 | 4.67 | 2.67 | 2.67 |
| 10 | 12.4 | 12 | 6.53 | 5.9 | 7.67 | 5.53 | 3.47 | 3.47 |
| 11 | 14 | 14 | 7.97 | 7 | 8.2 | 6.23 | 3.87 | 4.03 |
| 12 | 15.2 | 15 | 9.23 | 8 | 8.9 | 6.93 | 4.63 | 4.87 |
| 13 | 16.1 | 16 | 10.8 | 9.3 | 9.63 | 7.23 | 5.1 | 5.53 |
| 14 | 17.3 | 18 | 12.1 | 10.2 | 10.1 | 8.53 | 5.4 | 6.37 |
| 15 | 18.4 | 18 | 12.6 | 10.5 | 10.5 | 8.7 | 6.03 | 6.87 |

TABLE 4

Improvements (Drop) in Oxygen Transmission Rates
compared with Comp. 2
(in %)

| Day | EX. 1 | EX. 2 | EX. 3 | EX. 4 | EX. 5 | EX. 6 |
|---|---|---|---|---|---|---|
| 1 | (38) | (38) | (21) | 4 | 13 | 29 |
| 2 | 0 | (8) | (8) | 8 | 19 | 28 |
| 3 | 35 | 35 | 20 | 40 | 52 | 52 |
| 4 | 61 | 60 | 62 | 67 | 76 | 78 |
| 5 | 50 | 62 | 62 | 63 | 75 | 75 |
| 6 | 69 | 74 | 50 | 72 | 85 | 84 |
| 7 | 60 | 50 | 29 | 15 | 75 | 82 |
| 8 | 67 | 56 | 41 | 60 | 75 | 85 |
| 9 | 56 | 55 | 43 | 58 | 76 | 76 |
| 10 | 46 | 51 | 36 | 54 | 71 | 71 |
| 11 | 43 | 50 | 41 | 56 | 72 | 71 |
| 12 | 38 | 47 | 41 | 54 | 69 | 68 |
| 13 | 33 | 42 | 40 | 55 | 68 | 65 |
| 14 | 33 | 43 | 44 | 53 | 70 | 65 |
| 15 | 30 | 42 | 42 | 52 | 67 | 62 |

Notes to the Tables:
1. "Comp." refers to a comparative example.
2. "Ex." refers to an example of the invention.
3. The thickness of each layer, in mils (one mil = .001 inches) is indicated.
4. Negative values in the cells are given in parentheses.
5. Where no % is given for a material in a layer, the layer was made up of 100% of that material.
6. In Table 4, the percentage improvements were calculated by determining the difference in OTR between the example of the invention, on a given day, and comparative 2 on that same day; and then dividing this difference by the OTR of comparative 2 on that same day. For example, on day 5, Example 1 showed an OTR of 2.43 cc oxygen (STP)/m$^2$ · day@ 73° F. and 100% relative humidity inside and outside (ASTM D3985). On day 5, comparative 2 showed an OTR of 4.9 cc. The difference is 4.9 − 2.43 = 2.47 cc. This value is then divided by the OTR of comparative 2 on day 5. Thus, 2.47 divided by 4.9 = 50%.

It will be noted in Table 2 that the film of Comp. 2 had a single layer of EVOH of a thickness of 0.83 mils, and that the films of the Examples each had two layers of EVOH. The single EVOH layer of Comp. 2 had a thickness of 0.83 mils; the two layers of EVOH of each of the Examples had a total thickness of 0.83 mils. Although Comp. 2 and the films of the invention had the same total amount of EVOH in each respective film, the examples of the invention as exemplified in Tables 3 and 4 demonstrated, after the second day, consistent and substantial improvements in oxygen barrier performance. That is, these examples showed significant reduction in the oxygen transmission rate compared with Comparative 2. Table 5 shows the average % improvement in OTR, compared with Comparative 2, over the entire span of days 1 to 15 for each of Examples 1 to 6.

TABLE 5

Average Improvement (Drop) in Oxygen Transmission Rates
compared with Comp. 2 over days 1 to 15
(in %)

| EX. 1 | EX. 2 | EX. 3 | EX. 4 | EX. 5 | EX. 6 |
|---|---|---|---|---|---|
| 39% | 41% | 35% | 47% | 64% | 49% |

TABLE 6

Oxygen Transmission Rates

| Day | EX. 10 | EX. 11 |
|---|---|---|
| 1 | 1.1 | 1.1 |
| 2 | 1.1 | 1.1 |
| 3 | 1.1 | 1.1 |
| 4 | 1.1 | 1.1 |
| 5 | 1.1 | 1.1 |
| 6 | 1.1 | 1.1 |
| 7 | 1.1 | 1.1 |
| 8 | 1.2 | 0.9 |
| 9 | 1 | 1 |
| 10 | 1.3 | 0.9 |
| 11 | 1.4 | 0.9 |
| 12 | 1.45 | 0.8 |
| 13 | 1.45 | 0.8 |
| 14 | 1.4 | 0.8 |
| 15 | 1.5 | 0.8 |
| 16 | 1.45 | 0.7 | cc oxygen (STP)/m$^2$ · day @ 73° F. and 100% relative humidity inside and 50% relative humidity outside (ASTM D3985)

in accordance with alternative embodiments of the invention, a film can be made that includes an additional layer or layers comprising a polyamide, as described herein.

Prophetic examples in accordance with these alternative embodiments include those shown in Table 7:

TABLE 7

Prophetic Film Structures

| Ex. | | | | | | | | |
|---|---|---|---|---|---|---|---|---|
| 31 | 8% AB1 + 22% PE3 + 70% PE7 | 80% AD1 + 20% PE7 | PA1 | OB5 | PA1 | OB6 | 77.5% AD1 + 18% PE7 + 4.5% CM1 | 60% EN1 + 15% PE5 + 20% PE7 + 5% AB1 |
| Mils | 1.65 | 0.275 | 0.42 | 0.605 | 0.42 | 0.605 | 1.21 | 0.33 |
| Vol % | 30.0 | 5.0 | 11.0 | 7.5 | 11.0 | 7.5 | 22.0 | 6.0 |
| Ex. 32 | 8% AB1 + 22% PE3 + 70% PE7 | 80% AD1 + 20% PE7 | OB5 | PA1 | OB6 | PA1 | 77.5% AD1 + 18% PE7 + 4.5% CM1 | 60% EN1 + 15% PE5 + 20% PE7 + 5% AB1 |
| Mils | 1.65 | 0.275 | 0.42 | 0.605 | 0.42 | 0.605 | 1.21 | 0.33 |
| Vol % | 30.0 | 5.0 | 7.5 | 11.0 | 7.5 | 11.0 | 22.0 | 6.0 |
| Ex. 33 | 8% AB1 + 22% PE3 + 70% PE7 | 80% AD1 + 20% PE7 | PA1 | OB5 | PA1 | OB6 | PA1 | 77.5% AD1 + 18% PE7 + 4.5% CM1 | 60% EN1 + 15% PE5 + 20% PE7 + 5% AB1 |
| Mils | 1.65 | 0.275 | 0.403 | 0.42 | 0.403 | 0.42 | 0.403 | 1.21 | 0.33 |
| Vol % | 30.0 | 5.0 | 7.3 | 7.5 | 7.3 | 7.5 | 7.3 | 22.0 | 6.0 |
| Ex. 34 | 8% AB1 + 22% PE3 + 70% PE7 | 80% AD1 + 20% PE7 | PA1 | OB5 | PA1 | OB6 | 77.5% AD1 + 18% PE7 + 4.5% CM1 | 8% AB1 + 22% PE3 + 70% PE7 |
| Mils | 1.65 | 0.275 | 0.605 | 0.42 | 0.605 | 0.42 | 1.21 | 0.33 |
| Vol % | 30.0 | 5.0 | 11.0 | 7.5 | 11.0 | 7.5 | 22.0 | 6.0 |
| Ex. 35 | 8% AB1 + 22% PE3 + 70% PE7 | 80% AD1 + 20% PE7 | OB5 | PA1 | OB6 | PA1 | 77.5% AD1 + 18% PE7 + 4.5% CM1 | 8% AB1 + 22% PE3 + 70% PE7 |
| Mils | 1.65 | 0.275 | 0.42 | 0.605 | 0.42 | 0.605 | 1.21 | 0.33 |
| Vol % | 30.0 | 5.0 | 7.5 | 11.0 | 7.5 | 11.0 | 22.0 | 6.0 |
| Ex. 36 | 8% AB1 + 22% PE3 + 70% PE7 | 80% AD1 + 20% PE7 | PA1 | OB5 | PA1 | OB6 | PA1 | 77.5% AD1 + 18% PE7 + 4.5% CM1 | 8% AB1 + 22% PE3 + 70% PE7 |
| Mils | 1.65 | 0.275 | 0.403 | 0.42 | 0.403 | 0.42 | 0.403 | 1.21 | 0.33 |
| Vol % | 30.0 | 5.0 | 7.3 | 7.5 | 7.3 | 7.5 | 7.3 | 22.0 | 6.0 |

Examples 31 to 36 can also be made without the presence of the blue pigment master-batch (CM1), i.e. can be made as a clear film. In these additional embodiments, the layer containing the blue pigment as shown for Examples 31 to 36 would instead comprise 80% AD1+20% PE7.

Shelf Life/Color Test

Tomato is an aqueous product, and EVOH-containing films are subject to degradation in high moisture environments. In addition, tomato products in particular will express degradation in perceived quality or freshness over time by a degradation in color. To test the performance of film of the invention, several packages were made using film in accordance with the invention, and a control film. These packages contained a tomato product. The packages were grouped into pairs, where in each pair a first package was laid on a surface, and a second package made with the same film as the first package was stacked on top of the first package in direct contact with and covering the top of the first package. The top of each second package was thus exposed to the outside environment, and the top of each first package was in contact with the bottom of the second package. This test was arranged to evaluate and compare color degradation in a film of the invention (Example 5) and a control film (Comparative Example 1). The pairs of packages were subjected to accelerated shelf life testing at storage conditions of 37° C. and 75% relative humidity. The films used in making the packages were clear, and assessment of the color of the contained tomato product at the top of each second package ("Top" in Table 8), and at the top of each first package ("Contact" in Table 8) was made at 0 months, 3.5 months, and 6 months in accordance with ASTM E308-08. The aggregate results are shown in Table 8. The color quality values are given as a* value (ASTM E308-08).

TABLE 8

| Month | Comp. 1 Top | EX. 5 Top | Comp. 1 Contact | EX. 5 Contact |
|---|---|---|---|---|
| 0 | 22.43 | 22.43 | 22.43 | 22.43 |
| 3.5 | 16.71 | 19.42 | 15.11 | 17.21 |
| 6 | 13.7 | 16.5 | 9.87 | 13.05 |

The color quality of the tomato product proved to be better for both the top and bottom package, at both 3.5 and 6 months, for packages made with film of the invention than packages made with the comparative film.

Films in accordance with various embodiments of the invention demonstrate an OTR, as defined herein, (ASTM D3985) at 15 days of less than 18 cc oxygen/m$^2$·day @ 100% relative humidity inside and outside at 73° F. at one atmosphere, such as less than 15, less than 12, less than 10, and less than 8 cc oxygen/m$^2$·day @ 100% relative humidity inside and outside at 73° F. at one atmosphere.

Films in accordance with various embodiments of the invention demonstrate an OTR, as defined herein, (ASTM D3985) at 15 days of from 1 to 18 cc oxygen/m$^2$·day @ 100% relative humidity inside and outside at 73° F. at one atmosphere, such as from 2 to 15, from 3 to 12, from 4 to 10, and from 5 to 8 cc oxygen/m$^2$·day @ 100% relative humidity inside and outside at 73° F. at one atmosphere.

Film of the present invention can be used to make packages for packaging any suitable food or non-food product in any suitable packaging environment, including without limitation retort or aseptic packaging.

Films of the invention can be used in BiB (Bag-in-Box) applications. This type of application benefits from a more supple film, because of the manner in which bag-in-box packages are arranged. A plastic bag holding a liquid product is stored in an outer rigid cardboard or paperboard container. Films of the invention, in particular e.g. those of Examples 22 and 23, can be beneficially used in BiB applications.

Test Methodology

OTR tests were run according to ASTM D3985, using a Mocon OX-TRAN™ 10/50 ten-cell test unit. 4/½ inch diameter circles were cut across the web, three circles per sample. A standard film is loaded in cell #1.

OTR is the quantity of oxygen gas passing through a unit area of the parallel surfaces of a plastic film per unit time under the conditions of the test.

Distilled water was used in the test.

Tools and Equipment 2.1 MOCON OX-TRAN10/50 WITH 10.6 OHM RESISTOR
2.2 RECORDER OR DATA LOGGER
2.3 4¼" DIAMETER CIRCLE CUTTER
2.4 STOPCOCK OR SILICONE GREASE
2.5 WATER BATH TO CONTROL TEMPERATURE OF OX-TRAN 1050
2.6 1-MIL POLYETHYLENE FILM
2.7 POLYETHYLENE MESH (51% OPEN)
2.8 2¾" DIAMETER FILTER PAPERS
2.9 DISTILLED WATER OR SATURATED SALT SOLUTIONS (depending on RH requested)
2.10 SAFETY GLASSES
2.11 CLOSED-TOE SHOES Preparation of Test Sample 5.1 CUT 3 CIRCLES ACROSS THE WEB PER SAMPLE (REFER TO PUNCH PRESS PROCEDURE).
5.2 THE SAMPLES SHOULD BE WRINKLE FREE AND HAVE NO HOLES.
5.3 IDENTIFY EACH CIRCLE (ON THE OUTER EDGE OUTSIDE OF THE TEST AREA) AND THE PROTECTIVE PAPER WITH THE TSR NUMBER AND SAMPLE ID.
5.4 GAUGE 9 PLACES ON EACH CIRCLE WITHIN TEST AREA.

Setting up of Instrument 6.1 SET THE WATER BATH TO THE DESIRED TEMPERATURE±1° F.
6.2 SET THE DWELL TIME TO 15 MINUTES PER CELL.
6.3 CLEAN INSIDE THE BOTTOM AND TOP OF CELLS 2-10.
A STANDARD FILM IS ALWAYS LOADED IN CELL #1. DO NOT OPEN OR REMOVE THIS FILM FROM CELL #1.
6.4 GREASE THE BOTTOM RIM OF CELLS 2-10 WITH STOPCOCK GREASE OR SILICONE GREASE.
6.5 MAKE SURE THAT THERE IS NO DIRT, DUST, HAIR, ETC. ON THE O-RING ON TOP OF CELLS 2-10. IF NECESSARY, REMOVE ANY DIRT, ETC. BY WIPING THE O-RING WITH A KIMWIPE.

Test Procedure 7.1 STARTING WITH CELL #2, MAKE A SANDWICH OF EACH TEST SPECIMEN AS FOLLOWS:
   a. POLYETHYLENE MESH (SHOULD FIT INSIDE THE CELL)
   b. GREASE AROUND RIM ON THE BOTTOM OF THE CELL
   c. POLYETHYLENE FILM (SHOULD FIT OUTSIDE THE O-RING OF THE CELL)
   d. GREASE AROUND RIM OF POLYETHYLENE FILM
   e. FILTER PAPER WET WITH DISTILLED WATER OR THE APPROPRIATE SALT SOLUTION (SHOULD FIT INSIDE THE CELL)
      *NOTE: DISTILLED WATER IS USED FOR 100% RH TESTING. SATURATED SALT SOLUTIONS ARE USED FOR RH'S BETWEEN 10-98% RH.
   f. TEST SPECIMEN OF FILM, MAKING SURE THAT THE INSIDE OF THE FILM IS FACE DOWN ON THE BOTTOM OF THE CELL
   g. GREASE AROUND RIM OF SPECIMEN
   h. FILTER PAPER WET WITH DISTILLED WATER OR THE APPROPRIATE SALT SOLUTION
   i. POLYETHYLENE FILM
   j. POLYETHYLENE MESH
7.2 CLOSE LID AND TIGHTEN SNUGLY.
7.3 REPEAT STEPS 1-2 FOR THE REMAINING CELLS. (REMEMBER THAT TEST SPECIMENS ARE LOADED ONLY IN CELLS 2-10).
7.4 TURN SAMPLES IN WITH IN/OUT SWITCH ON THE FRONT OF THE INSTRUMENT.
7.5 MAKE SURE THAT THE TEST FLOW ON EACH CELL IS READING 10 cc/min. IF NOT ADJUST TO 10.
7.6 MAKE SURE THE GAS SELECTION SWITCH ON THE TOP LEFT HAND CORNER IS TURNED TO CARRIER PURGE.
7.7 MAKE SURE THE SENSOR SWITCH ON THE TOP RIGHT HAND CORNER IS TURNED TO BYPASS SENSOR.
7.8 LET SIT OVERNIGHT TO DEGAS AND PURGE ALL OXYGEN FROM THE SPECIMENS. TYPICALLY IT TAKES LONGER FOR THE SAMPLES TO DEGAS WHEN RUNNING OTR UNDER HUMIDIFIED CONDITIONS THAN AT 0% RH.
7.9 IF USING A DATA LOGGER, USE THE FOLLOWING PROCEDURE TO OBTAIN A BASELINE READING FOR EACH CELL THE NEXT MORNING.
  a. PUSH THE ADVANCE BUTTON ON THE FRONT OF THE OX-TRAN TO BRING IT TO CELL #1.
  b. MAKE SURE THAT THE MODE SWITCH IS SET ON AUTO (IN THIS MODE, THE INSTRUMENT WILL AUTOMATICALLY SWITCH FROM ONE CELL TO THE NEXT).
  c. TURN THE SENSOR SWITCH TO INSERT SENSOR.
  d. TURN THE PRINTER ON.
  e. LET CYCLE THROUGH ALL 10 CELLS AND AGAIN THROUGH CELL #1.
  f. TURN THE SENSOR SWITCH BACK TO BYPASS SENSOR.
  g. TURN THE PRINTER OFF.
7.10 IF USING A RECORDER, USE THE FOLLOWING PROCEDURE TO OBTAIN A BASELINE READING FOR EACH CELL THE NEXT MORNING:
  a. PUSH THE ADVANCE BUTTON ON THE FRONT OF THE OX-TRAN TO BRING IT TO CELL #1.
  b. MAKE SURE THAT THE MODE SWITCH IS SET ON AUTO (IN THIS MODE, THE INSTRUMENT WILL AUTOMATICALLY SHIFT FROM ONE CELL TO THE NEXT).
  c. MAKE SURE THAT THE PEN IS ON THE ZERO LINE BEFORE PROCEEDING. IF NOT, ZERO THE RECORDER.
  d. TURN THE SENSOR SWITCH TO INSERT SENSOR.
  e. TURN THE CHART PAPER ON AND SET mV to 1 mV.
  f. LET CYCLE THROUGH ALL 10 CELLS AND AGAIN THROUGH CELL #1.
  g. TURN THE SENSOR SWITCH BACK TO BYPASS SENSOR.
  h. TURN THE CHART PAPER OFF.
7.11 IF A GOOD BASELINE HAS BEEN ESTABLISHED (IDEALLY IT SHOULD READ BELOW 1.0 cc/m$^2$/day) DEPENDING ON THE OX-TRAN AND CONDITIONS, TURN THE GAS SELECTION SWITCH TO OXYGEN PURGE TO EXPOSE THE SPECIMENS TO OXYGEN. LET SIT OVERNIGHT TO ALLOW SPECIMENS TO CONDITION IN OXYGEN.
7.12 IF USING A DATA LOGGER, READ THE OXYGEN TRANSMISSION RATE OF EACH CELL THE NEXT MORNING USING THE FOLLOWING PROCEDURE:
  a. PUSH THE ADVANCE BUTTON ON THE FRONT OF THE OX-TRAN TO BRING IT TO CELL #1.
  b. MAKE SURE THAT THE MODE SWITCH IS SET ON AUTO (IN THIS MODE, THE INSTRUMENT WILL AUTOMATICALLY SHIFT FROM ONE CELL TO THE NEXT).
  c. TURN THE SENSOR SWITCH TO INSERT SENSOR.
  d. TURN THE PRINTER ON.
  e. LET CYCLE THROUGH ALL 10 CELLS AND AGAIN THROUGH CELL #1.
  f. TURN THE SENSOR SWITCH BACK TO BYPASS SENSOR.
  g. TURN THE PRINTER OFF.
7.13 IF USING A RECORDER, READ THE OXYGEN TRANSMISSION RATE OF EACH CELL THE NEXT MORNING USING THE FOLLOWING PROCEDURE:
  a. PUSH THE ADVANCE BUTTON ON THE FRONT OF THE OX-TRAN TO BRING IT TO CELL #1.
  b. MAKE SURE THAT THE MODE SWITCH IS SET ON AUTO (IN THIS MODE, THE INSTRUMENT WILL AUTOMATICALLY SHIFT FROM ONE CELL TO THE NEXT).
  c. MAKE SURE THAT THE PEN IS ON THE ZERO LINE BEFORE PROCEEDING. IF NOT, ZERO THE RECORDER.
  d. TURN THE SENSOR SWITCH TO INSERT SENSOR.
  e. TURN THE CHART PAPER ON AND SET mV TO 1 mV. THE STANDARD IS ALWAYS RUN USING 1 mV. HOWEVER, FOR THE TEST SPECIMENS, THE VOLTAGE MAY HAVE TO BE INCREASED TO KEEP THE PEN FROM RUNNING OFF THE CHART. RECORD THE VOLTAGE USED FOR EACH SPECIMEN ON THE CHART.
  f. LET CYCLE THROUGH ALL 10 CELLS AND AGAIN THROUGH CELL #1.
  g. TURN THE SENSOR SWITCH BACK TO BYPASS SENSOR.
  h. TURN THE CHART PAPER OFF.
7.14 CONTINUE TO TAKE DAILY READINGS AND RECORD THEM IN YOUR NOTEBOOK UNTIL A CONSTANT READING IS OBTAINED. CONCLUDE THE TEST WHEN THE OTR CHANGES LESS THAN 3-5% OF THE RATE THE DAY BEFORE.
  NOTE: TYPICALLY, MOST MATERIALS REQUIRE 14 DAYS TO TEST AT 73° F. THE COLDER THE TEST TEMPERATURE, THE LONGER IT TAKES TO TEST.
7.15 TURN THE GAS SELECTION SWITH TO CARRIER PURGE.
7.16 REMOVE TEST SPECIMENS FROM THE OX-TRAN (LEAVE STANDARD IN CELL #1).

What is claimed is:
1. A coextruded multilayer film comprising:
  a) a core layer comprising polyamide;
  b) a first intermediate layer, directly adjacent the core layer, comprising ethylene vinyl alcohol copolymer
  c) a second intermediate layer, directly adjacent the core layer, comprising ethylene vinyl alcohol copolymer;
  d) a first outer layer comprising olefinic copolymer or amorphous cyclic olefin copolymer;
  e) a second outer layer comprising olefinic copolymer or amorphous cyclic olefin copolymer;
  f) a first tie layer adhering the first intermediate layer to the first outer layer; and
  g) a second tie layer adhering the second intermediate layer to the second outer layer;
  wherein the ethylene vinyl alcohol copolymer of the first intermediate layer has an ethylene content, in mole %, at least 5 greater than the ethylene content, in mole %, of the ethylene vinyl alcohol copolymer of the second intermediate layer.
2. The coextruded multilayer film of claim 1 wherein the polyamide comprises nylon 6.
3. The coextruded multilayer film of claim 1 wherein the ethylene vinyl alcohol copolymer of the first intermediate layer has an ethylene content of from 27 mole % to 48 mole %.

4. The coextruded multilayer film of claim 1 wherein the ethylene vinyl alcohol copolymer of the second intermediate layer has an ethylene content of from 22 mole % to 38 mole %.

5. The coextruded multilayer film of claim 1 wherein at least one of the outer layers comprises a material selected from the group consisting of:
   a) a blend of low density polyethylene and linear low density polyethylene;
   b) a blend of low density polyethylene and an ethylene/alpha-olefin interpenetrating network resin;
   c) propylene/ethylene copolymer;
   d) high density polyethylene; and
   e) propylene homopolymer.

6. The coextruded multilayer film of claim 1 wherein the tie layers each comprise an anhydride grafted polymer.

7. The coextruded multilayer film of claim 1 wherein the film exhibits an elongation at yield (ASTM D 882) of less than 15% in each of the longitudinal and transverse directions.

8. An aseptic package comprises:
   a) a sterilized food product, and
   b) a sterilized pouch in which the sterilized food product is disposed, the sterilized pouch comprising a coextruded multilayer film comprising
      i) a core layer comprising polyamide;
      ii) a first intermediate layer, directly adjacent the core layer, comprising ethylene vinyl alcohol copolymer;
      iii) a second intermediate layer, directly adjacent the core layer, comprising ethylene vinyl alcohol copolymer;
      iv) a first outer layer comprising olefinic copolymer or amorphous cyclic olefin copolymer;
      v) a second outer layer comprising olefinic copolymer or amor-phous cyclic olefin copolymer;
      vi) a first tie layer adhering the first intermediate layer to the first outer layer; and
      vii) a second tie layer adhering the second intermediate layer to the second outer layer;
   wherein the ethylene vinyl alcohol copolymer of the first intermediate layer has an ethylene content, in mole %, at least 5 greater than the ethylene content, in mole %, of the ethylene vinyl alcohol copolymer of the second intermediate layer.

9. The package of claim 8 wherein the polyamide comprises nylon 6.

10. The package of claim 8 wherein the ethylene vinyl alcohol copolymer of the first intermediate layer has an ethylene content of from 27 mole % to 48 mole %.

11. The package of claim 8 wherein ethylene vinyl alcohol copolymer of the second intermediate layer has an ethylene content of from 22 mole % to 38 mole %.

12. The package of claim 8 wherein the second outer layer comprises a blend of amorphous cyclic olefin copolymer and semicrystalline olefinic polymer.

13. The package of claim 12 wherein the semicrystalline olefinic polymer is selected from the group consisting of ethylene polymer, ethylene copolymer, and polypropylene.

14. The package of claim 8 wherein the olefinic polymer, of at least one of the first and second outer layers, is selected from the group consisting of
   a) a blend of low density polyethylene and linear low density polyethylene;
   b) a blend of low density polyethylene and an ethylene/alpha-olefin interpenetrating network resin;
   c) propylene/ethylene copolymer;
   d) high density polyethylene;
   e) propylene homopolymer; and
   f) ethylene/norbornene copolymer.

* * * * *